United States Patent [19]

Gachot

[11] 4,291,863
[45] Sep. 29, 1981

[54] ANTIFRICTION DEVICE FOR A VALVE CONTROL SHAFT

[76] Inventor: Jean Gachot, 26 bis, avenue de Paris, 95230 Soisy Sous Montmorency, France

[21] Appl. No.: 82,478

[22] Filed: Oct. 9, 1979

[30] Foreign Application Priority Data

Oct. 17, 1978 [FR] France .................................. 78 29546

[51] Int. Cl.³ .......................... F16K 1/22; F16K 41/04
[52] U.S. Cl. ..................................... 251/214; 251/306; 251/308; 277/168; 277/177
[58] Field of Search ............... 251/214, 305, 306, 307, 251/308; 277/94, 110, 179, 168, 177; 16/2

[56] References Cited

U.S. PATENT DOCUMENTS

| | | | |
|---|---|---|---|
| 3,096,071 | 7/1963 | Fisher | 251/308 |
| 3,567,178 | 3/1971 | Nelson | 251/214 |
| 3,582,041 | 6/1971 | Priesc | 251/214 |
| 3,698,684 | 10/1972 | Grenier | 251/308 |
| 3,912,221 | 10/1975 | Fenster et al. | 251/214 |
| 4,055,323 | 10/1977 | Gachot | 251/306 |
| 4,146,206 | 3/1979 | Malloy et al. | 251/308 |

Primary Examiner—Martin P. Schwadron
Assistant Examiner—G. L. Walton
Attorney, Agent, or Firm—Young & Thompson

[57] ABSTRACT

The antifriction device for the control shaft of a flow-regulating valve comprises a hollow body and a closure member rotatably mounted within the hollow body. An annular flange is formed on the control shaft at the level of at least one of the packing gland seals and applied against an annular shoulder of the valve body which surrounds the control shaft, a washer formed of material which is capable of creep deformation being interposed between the flange and the shoulder. A peripheral groove is formed in the shaft opposite to the washer and receives the washer material in the event of creep flow.

6 Claims, 5 Drawing Figures

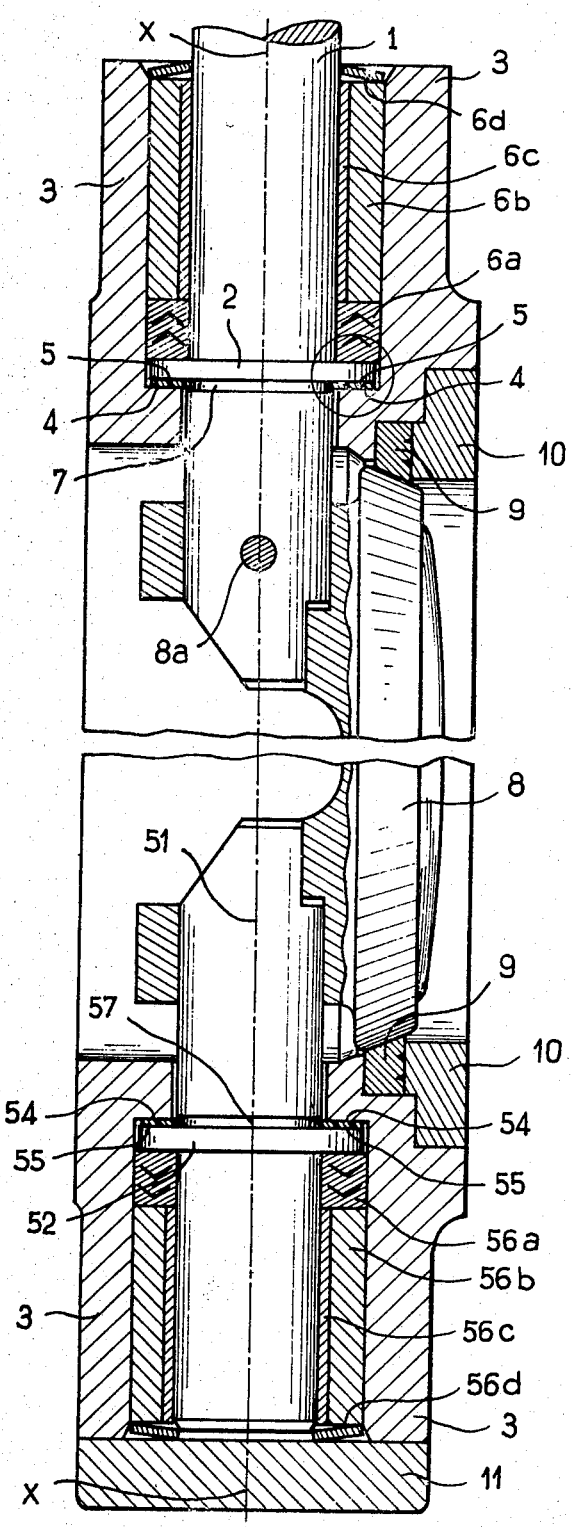
FIG_1

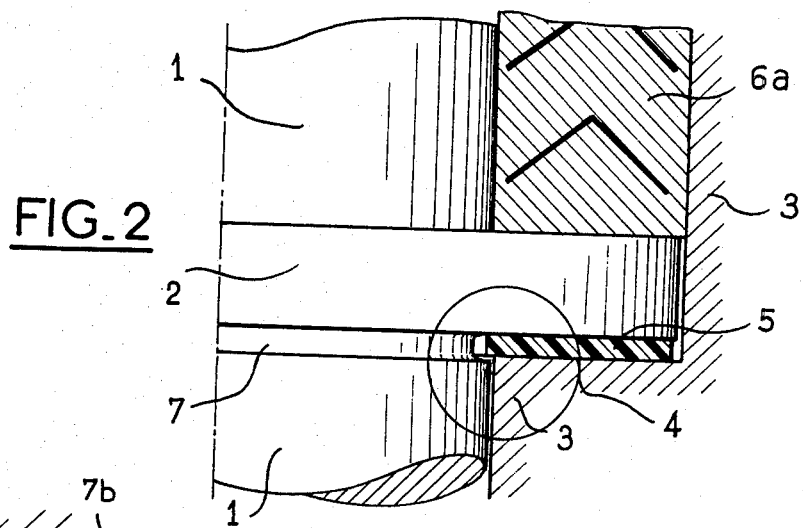
FIG._2
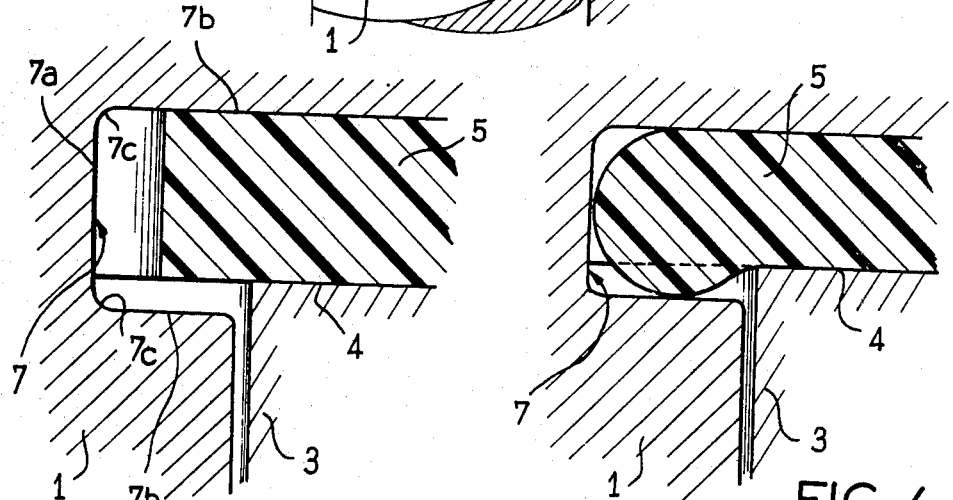
FIG._3
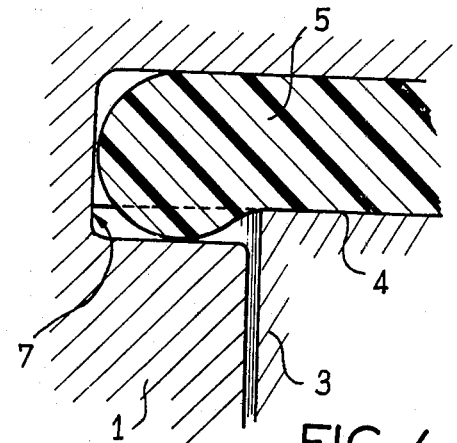
FIG._4
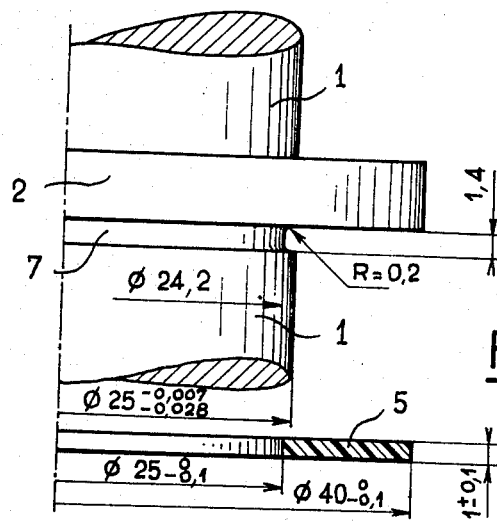
FIG._5

ANTIFRICTION DEVICE FOR A VALVE CONTROL SHAFT

This invention relates to an antifriction device for the control shaft of a valve which serves to regulate and especially to stop the circulation of a fluid under pressure within a pipe. A practical objective to which the invention is more specifically directed is the leak-tightness which must exist along the control shaft penetration through the wall of the pressurized enclosure. The invention relates to all types of cocks and valves but applies more particularly to disc valves which are also designated as "butterfly" valves.

In designs which are known at the present time, leak-tightness is ensured by means of a gland packing or seal applied against an annular flange of the control shaft and is often completed by a sliding washer of fluorocarbon resin, said washer being engaged on the shaft on the other side of the annular flange and clamped between this latter and an annular shoulder of the valve body.

Apart from the fact that washers of this type have self-lubricating properties which facilitate valve control operations, they also contribute to the achievement of the desired leak-tightness. In fact, by reason of the creep deformation of the resin, the two faces of the washer are molded respectively against the face of the annular flange and against the face of the annular shoulder, thus filling the smallest interstices and playing a part in the achievement of leak-tightness.

However, the present Applicant has found that, in the case of valves which are equipped in this manner and in which the closure member is subjected to a high pressure on the upstream side, and/or in which the operating temperature is of a high order, the material of the antifriction washer disappears over part of this latter (for example over ¼ or 1/5 of its circumference). This results in a metal-to-metal friction of parts which are normally separated by the washer, thereby entailing the risk of progressive seizure of the closure member control shaft.

Moreover, experience has shown that leaks then appear at the level of the closure member and have a tendency to increase each time the valve is operated, thus making it necessary to disassemble the control shaft in order to replace the washer. This untimely wear of the washer thus represents a serious limitation and imposes a heavy cost penalty on the user.

The present Application has found that the above-mentioned disappearance of part of the washer resulted from creep deformation or flow of the fluorocarbon material as a result of an unequal distribution of the pressures exerted by means of the control shaft which is actuated by the pressure of the fluid on the closure member. This phenomenon is particularly marked in the case of disc valves by reason of the relative displacement of the disc with respect to the axis of rotation of the control shaft.

The present invention is intended to overcome the disadvantages mentioned in the foregoing and is based on the discovery that it is possible by making use of simple and inexpensive means to maintain the entire antifriction washer in service in spite of the dissymmetry of forces exerted on this latter.

In accordance with the invention, the antifriction device for the control shaft of a valve which serves to regulate the flow of a fluid and especially to withstand high pressures and temperatures comprises a hollow body to which the fluid inlet and outlet pipes are connected. A closure member is rotatably mounted within the hollow body and connected to a control shaft having an extension externally of said body. The control shaft is provided at the level of at least one of the packing gland seals with an annular flange which is applied with interposition of a washer of creep-deformable material against an annular shoulder of the valve body which surrounds the control shaft. The device is distinguished by the fact that a groove is formed in the periphery of the shaft opposite to the washer.

Experience has in fact shown the surprising result that the presence of the groove aforesaid completely prevented the disappearance of part of the washer by creep flow of its material between the control shaft and the bore in which it rotates.

In an advantageous embodiment, the height of the groove as measured parallel to the axis of the shaft is at least equal to the thickness of the washer prior to creep deformation.

The creep-deformable material thus penetrates entirely into the groove without coming up against the external surface of the shaft and without sliding between this latter and the valve body.

In a preferred embodiment, the groove is a figure of revolution about the axis of the control shaft.

The groove thus has a uniform profile which acts in opposition to any irregularities in thickness of the washer which may result from creep deformation.

In an advantageous version of this embodiment, the groove has a U-shaped cross-section in which the two arms of the U are at right angles to the axis of the shaft and the bottom portion which is parallel to said axis is joined to each arm by means of an arcuate portion.

In all embodiments of the invention, the internal diameter of the washer of creep-deformable material is preferably such that, once it has been placed in position on the shaft, the washer is engaged in the groove of the shaft to a partial extent whilst a small clearance space remains between its external diameter and the annular shoulder of the valve body which surrounds the shaft.

Although the internal diameter of the washer is slightly smaller than the diameter of the shaft, the plasticity of the material constituting the washer in fact makes it possible to slide this latter with a slightly negative fit up to the groove location; the washer then reverts to its normal dimensions and is thus engaged within the interior of the groove around the entire periphery of the shaft even before any creep deformation takes place. Subsequent creep deformation is then only likely to thrust the material into the groove to an even greater extent without any attendant danger of penetration of said material between the shaft and the bore provided for this latter since the material is trapped within the groove and rapidly prevents any further creep deformation.

Further particular features of the invention will become apparent from the following description, reference being made to the accompanying drawings which are given by way of example without any limitation being implied, and in which:

FIG. 1 is a sectional view taken along the plane defined by the axes of the control shaft and of the pipes and showing a disc valve in accordance with the invention;

FIG. 2 is an enlarged presentation of that portion of FIG. 1 which is surrounded by a circle;

FIG. 3 is a presentation which is even further enlarged of that portion of FIG. 2 which is surrounded by a circle, prior to creep deformation of the washer;

FIG. 4 is a view which is similar to FIG. 3 after creep deformation;

FIG. 5 partly reproduces two elements of FIG. 2 and indicates by way of example the dimensions and tolerances of said elements expressed in millimeters in the case of a concrete example of construction in accordance with the invention.

The disc valve in accordance with the invention as shown in FIG. 1 comprises a valve body 3 and a control shaft 1 which penetrates within said body. The disc 8 is rigidly fixed to the shaft 1 by means of the dowel-pin 8a and is capable of pivotal displacement with the half-shaft 51. The axis of the inlet and outlet pipes (not shown in the drawings) is located in the plane of the figure at right angles to the axis of the shaft 1. In the closed position, the disc 8 is applied against the annular seating 10 by means of the seal 9.

An annular flange 2 which is integral with the shaft 1 serves as a thrust-bearing member for the sealing device (packing gland seal) formed by cylindrical elements 6a, 6b, 6c and 6d which are housed within the annular space formed between the valve body 3 and the shaft 1.

A similar structure is again provided around the half-shaft 51 with its annular flange 52 and the sealing elements 56a, 56b, 56c and 56d which are housed between the valve body 3 and the half-shaft 51.

The annular flanges 2 and 52 are applied respectively against the annular shoulders 4 and 54 of the valve body 3 by means of washers 5 and 55. Grooves 7 and 57 located opposite to said washers are formed respectively on the periphery of the shafts 1 and 51 and are figures of revolution about the axis X—X.

For the sake of enhanced simplicity and clarity of the description, it will be assumed hereinafter that the axis X—X which is common to the shafts 1 and 51 is vertical.

In the same embodiment, the cross-section of a groove along a diametral vertical plane has the shape of a U having horizontal arms and one face of the annular flange forms one of said arms. The base 7a of the U is a vertical segment which is joined to the horizontal arms 7b by two circular arcs 7c which subtend an angle of 90° and have a short radius (as shown in FIG. 3).

Furthermore, as shown more distinctly in FIGS. 3 and 4 and more especially in FIG. 4, the vertical height of the groove 7 (or 57) is slightly greater than the thickness of the washer 5 (or 55) prior to creep deformation.

FIG. 5 is taken from the manufacturing drawings of an experimental prototype and shows the dimensions, tolerances and clearances actually adopted in the case of the same embodiment.

It is thus apparent that the mean internal diameter of the washer 5 or 55 (25−0.05 mm) is smaller by approximately three hundredths of a millimeter than the mean external diameter of the shaft 1 or 51 (25−0.017 mm). The washer must therefore be forcibly engaged on the shaft with a negative fit of 3/100 millimeter and displaced up to its intended location opposite to the groove. In this position, the washer is no longer compressed and accordingly reverts to its original internal diameter. Since this internal diameter is smaller than that of the shaft, the washer therefore engages within the groove 7 or 57. The clearance (not shown in FIG. 4) between the external diameter of the washer and of the internal diameter of the valve body is approximately six hundredths of a millimeter.

When the valve is put under pressure and especially if the fluid which flows through the valve is at high temperature, there is a resultant creep deformation or flow of the resin constituting the washer. However, as shown in FIG. 4, that fraction of resin which has thus been driven out remains within the groove 7 or 57 in which the washer 5 or 55 had already been engaged and does not penetrate between the shaft 1 or 51 and the internal bore of the valve body 3. Compression of the material within the groove 7 or 57 rapidly limits the creep deformation, with the result that the washers remain over their entire circumference. The shafts 1 and 51 therefore continue to rotate in very smooth motion. Moreover, these shafts remain vertical and no leakage appears at the level of the packing gland seals.

At all events, the foregoing represents an attempt to explain the phenomenon which has been observed but the invention is not directly related to these explanations.

Tests carried out on the experimental prototype have shown, surprisingly, that the invention which consists in forming a groove in the valve shaft opposite to the washer, and more particularly the mode of execution under test which consists in imprisoning the washer in said groove, have made it possible to carry out over 200,000 valve opening and closing operations without any appearance of leakages and without any need to replace the friction washer.

As can readily be understood, the invention is not limited to the embodiments described in the foregoing and alternative modes of execution can accordingly be contemplated.

Thus the radial cross-section of the groove along a vertical plane can have a shape other than that of a U and complementary annular cavities could be formed in the annular flange of the shaft or in the circular shoulder of the valve body. The invention extends to all embodiments comprising means for maintaining shafts in the vertical position as well as leak-tightness of the packing gland seals in spite of creep deformation of the washers since it has been shown by practical experience that leak-tightness is also improved in the case of spherical plug cocks although to a lesser extent than in the case of disc valves.

What is claimed is:

1. An antifriction device for a valve which serves to regulate the flow of a fluid and especially to withstand high pressures and temperatures, comprising a hollow body to which the fluid inlet and outlet pipes are connected and in which is rotatably mounted a closure member connected to a control shaft having a part extending externally of said body through a packing gland seal, the shaft being provided at the level of the packing gland seal with an annular flange applied with interposition of a washer of creep-deformable material against an annular shoulder of the valve body which surrounds the control shaft, wherein a groove is formed in the periphery of said shaft opposite to said washer, said groove being adapted to receive the washer material after creep deformation of the same in response to high temperature or high pressure to which the valve is subjected, said groove limiting the amount of said creep-deformation.

2. An antifriction device according to claim 1, the valve also comprising a half-shaft connecting the closure member to the body opposite to the control shaft, a part of the half-shaft extending through a packing gland seal, the half-shaft being provided at the level of its packing gland seal with an annular flange applied with interposition of a washer of creep-deformable material against an annular shoulder of the valve body which surrounds the half-shaft, wherein a groove is formed in the periphery of said half-shaft opposite to said washer, said groove being adapted to receive the washer material after creep deformation of the same.

3. A device according to claim 1, wherein the height of the groove as measured parallel to the axis of the control shaft is at least equal to three-quarters of the thickness of the washer prior to creep deformation.

4. A device according to claim 1, wherein the groove is a figure of revolution about the axis of the control shaft.

5. A device according to claim 1, wherein the groove has a substantially U-shaped cross section in which the two arms of the U are at right angles to the axis of the control shaft and the bottom portion which is parallel to said axis is joined to each arm by means of an arcuate portion.

6. A device according to claim 1, wherein the washer of creep-deformable material has an internal diameter such as to permit engagement within the groove after said washer has been placed in position on the control shaft, the height of the groove as measured parallel to the axis of the control-shaft being at least equal to the thickness of the washer prior to creep deformation.

* * * * *